Figure 1:
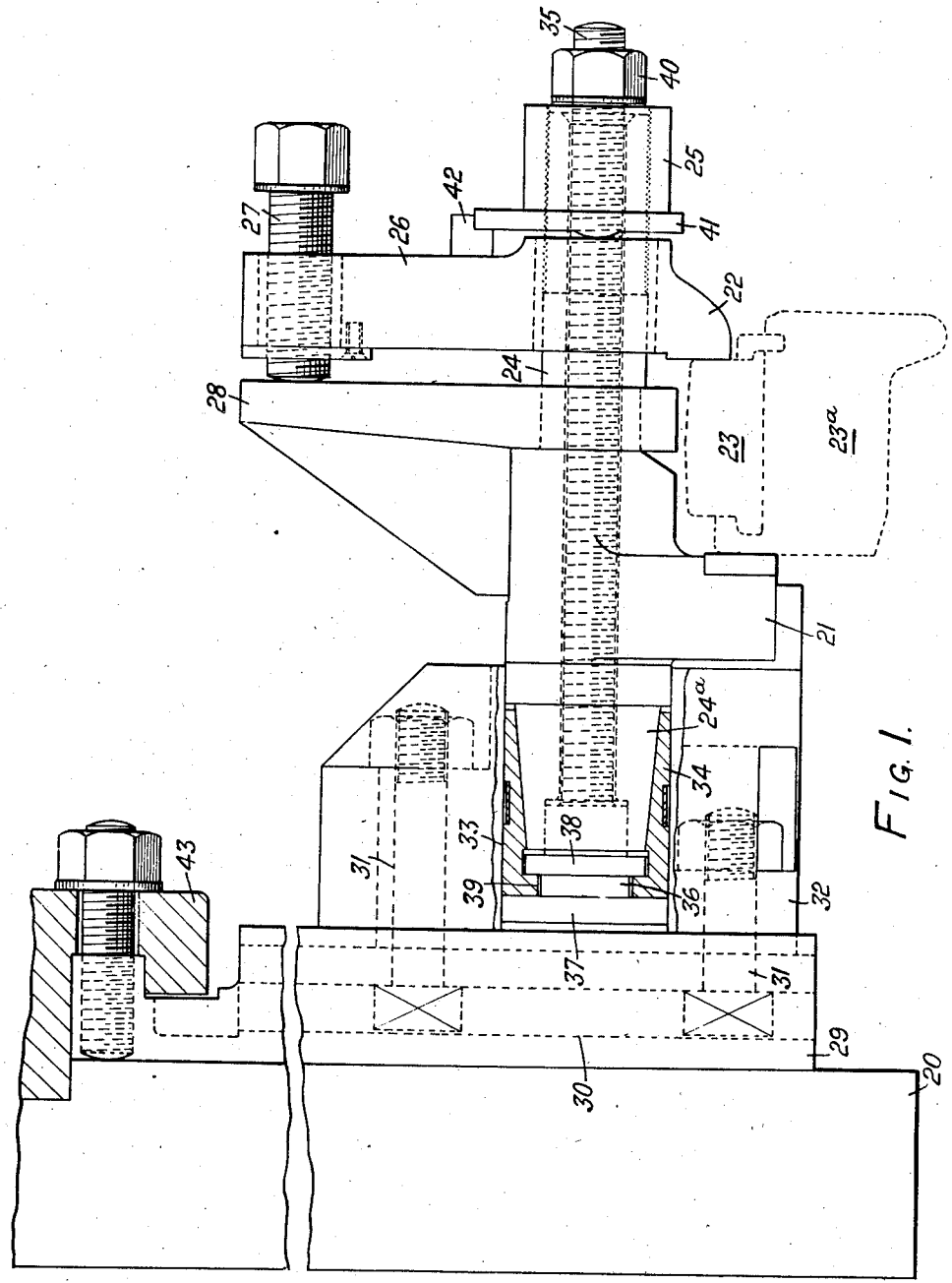

May 29, 1945. A. B. CLEMENTS 2,377,072
LATHE DRIVER DEVICE
Filed March 7, 1944 2 Sheets-Sheet 1

May 29, 1945.  A. B. CLEMENTS  2,377,072
LATHE DRIVER DEVICE
Filed March 7, 1944   2 Sheets-Sheet 2
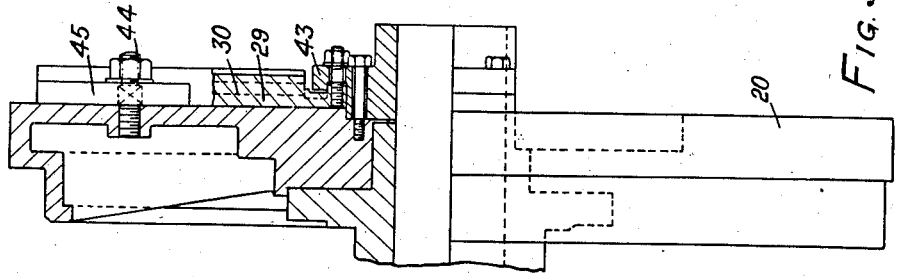
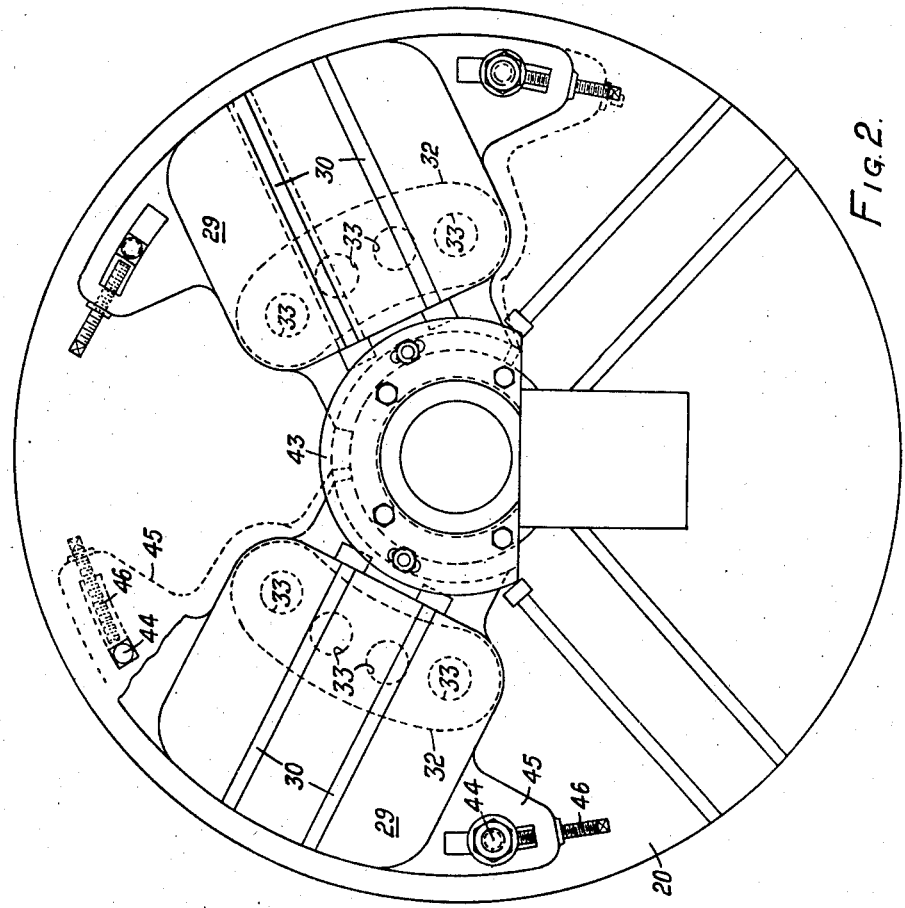

Patented May 29, 1945

2,377,072

UNITED STATES PATENT OFFICE 2,377,072

LATHE DRIVER DEVICE

Alexander Blair Clements, Glasgow, Scotland, assignor to Scottish Machine Tool Corporation Limited, Glasgow, Scotland, a company of Great Britain Application March 7, 1944, Serial No. 525,402
In Great Britain February 26, 1943

2 Claims. (Cl. 82—40)

The subject of this invention is an improved lathe driver device for use in conjunction with a railway-wheel-turning faceplate lathe.

A lathe driver device according to the invention includes, besides, a socket-presenting member adapted to be adjustably mounted on the faceplate, a hollow spindle adapted to be secured at one end in a socket of the socket-presenting member, a bolt extending axially of the spindle, means operable through the medium of the bolt and fitted to the socket-engaging end of the spindle for the purpose of securing the spindle in the socket, and complementary relatively adjustable clamp members carried by said spindle and adapted for engagement with the rim and/or the tyre portion of a railway wheel.

The clamp members are engageable with opposite ends of the rim and/or tyre of the wheel and when in use are located in an inter-spoke space of the wheel.

A lathe driver device according to the invention is illustrated in the accompanying drawings in which Fig. 1 is an axial section of the lathe faceplate equipped with a driver device. Fig. 2 is an elevation and Fig. 3 a half side elevation half axial section of a faceplate adapted for reception of a pair of driver devices.

Referring to the drawings, the lathe driver device shown in Fig. 1 is adapted to be adjustably mounted on a lathe faceplate 20 and includes a complementary pair of clamp members 21, 22 which are engageable with opposite ends of the rim 23 of a wheel and which when in use are located in an inter-spoke space of the wheel.

The clamp member 21 is engageable with the outer end face of the wheel and is formed unitary with a hollow clamp spindle 24 projecting horizontally from the faceplate 20. This clamp member 21 is hereinafter referred to as the outer clamp member. The other or inner clamp member 22 is strung on the end portion of the spindle 24 remote from the faceplate and is held thereon by a clamping nut 25 screw-threaded on the overhung end portion of the spindle 24.

The clamp member 22 forms part of a radially disposed lever 26 of which the outer or short arm 22 is engageable directly with the rim 23 of the wheel, and of which the inner or longer arm is provided with a setscrew stop 27 which engages an abutment bracket 28 strung on the spindle 24 between the clamp members 21, 22.

For attaching the clamp spindle 24 to the faceplate 20 there is provided a radius plate 29 adapted to be attached to the faceplate 20 in such wise that the radius plate 29 may be adjusted angularly clock-hand fashion, through a small range relatively to the faceplate, about the axis of rotation of the faceplate, i. e., the axis of the lathe. Formed on the outer face of the radius plate 29 are substantially radially disposed grooves or slots 30 of T-form in cross-section for reception of the T-heads of bolts 31 which serve adjustably to secure to the radius plate 29 a socket-block member 32. This socket-block member 32 is formed with a plurality of cylindrical sockets 33 pitched apart along an arc concave to the lathe axis.

The faceplate-end portion of the spindle 24 is engageable selectively in these sockets 33 and is adapted to be secured in the selected socket by means of a split annular expansile collet sleeve 34 surrounding the faceplate-end portion 24a of the spindle 24 and interposed between said end portion of the spindle and the bore of the socket. The faceplate-end portion 24a of the spindle is of conical form, converging towards the faceplate 20, and the bore of the collet 34 is of female conical form for mating engagement with the coned end portion 24a of the spindle. The outer circumference of the collet is cylindrical for engagement with the bore of the socket 33. For the purpose of exercising the required axial pressure on the faceplate-end of the collet 34 so as to thrust the collet "up" the coned end 24a of the spindle and thus to secure the spindle within the socket, there is provided a long bolt 35 which extends axially of the hollow bore of the spindle 24 and which is equipped on its faceplate end with a head 36 presenting an axially-spaced pair of collars 37, 38 between which inwardly projects an annular flange 39 formed on the faceplate-end of the collet 34, so that axial movement of the bolt 35 is transmitted to the collet. The other end portion of the bolt protrudes beyond the overhung end of the spindle 24 and is screw-threaded and equipped with a collet-locking nut 40. By tightening this nut 40, the collet 34 is drawn "up" the coned end 24a of the spindle 24, and the spindle is thus secured in the selected socket 33 of the socket-block member 32. As will be understood, the radius plate 29 together with the socket-block member 32 is adjustable clock-hand fashion relatively to the faceplate 20, and the socket-block member 32 is adjustable on the radius plate, radially of the faceplate.

When the clamping nut 25 on the overhung end of the spindle 24 is tightened, the rim 23 of the railway wheel is gripped endwise between the clamp members 22, 21. The inner clamp member 22 directly engages the inner end face of the rim proper 23 of the wheel, and the outer clamp member 21 engages the outer end face of the usual wheel tyre 23a secured on the rim 23.

A "rocker" washer 41 is interposed between the clamping nut 25 and the inner clamp member 22, said washer being held against rotation on the spindle 24 by a stop 42 provided on the lever 26.

The faceplate is provided with a centrally located annular flange 43 which engages the inner portion of the radius plate 29.

As shown in Fig. 2, two driver devices are adapted to be mounted on the faceplate 20.

The radius plate 29 of each driver device is adjustably attached to the faceplate 20 by means of the flange 43 and by means of a pair of bolts 44 penetrating elongated slots in lateral bracket extensions 45 of the radius plate 29. Each bracket 45 is fitted with an adjusting screw 46.

I claim:

1. A lathe driver device for use in conjunction with a faceplate lathe for turning railway wheels, including, in combination with a faceplate, a socket-presenting member adjustably carried by said faceplate, a tubular spindle engaging at one end a socket of said member, a bolt extending axially through the entire length of said spindle, means operable through the medium of said bolt and fitted to said end of said spindle for securing said spindle in said socket, and complementary relatively adjustable clamp members carried by said spindle and engageable with at least one peripheral portion of a railway wheel.

2. A lathe driver device as claimed in claim 1 in which the spindle securing means consists of a split collet interposed between the end of the spindle and the socket.

ALEXANDER BLAIR CLEMENTS.